United States Patent [19]

Dossier

[11] Patent Number: 4,585,092

[45] Date of Patent: Apr. 29, 1986

[54] DEVICE FOR SETTING THE ATTITUDE AND THE MEASURING HEIGHT OF THE BODY OF A VEHICLE TO BE CHECKED ON A SURFACE PLATE, ELEVATOR, STAYS OR OTHER MEANS WITHOUT SUBJECTING IT TO ANY WARPING STRESS

[75] Inventor: Michael Dossier, Orgeval, France

[73] Assignee: Facom, Morangis, France

[21] Appl. No.: 426,741

[22] Filed: Sep. 29, 1982

[51] Int. Cl.$^4$ .............................................. B60S 13/00
[52] U.S. Cl. .................................. 187/8.45; 187/8.75; 254/134
[58] Field of Search .................. 187/8.57, 8.45, 8.43, 187/8.59, 8.75, 8.41; 414/678; 254/2 R, 2 C, 93 L, 93 R, DIG. 4, 133, 134, 101, 89 R, 89 H

[56] References Cited

U.S. PATENT DOCUMENTS

| 1,462,040 | 7/1923 | McKone | 254/134 |
| 1,561,753 | 11/1925 | Swanner | 187/8.59 |
| 2,015,357 | 9/1935 | Weaver | 187/8.45 |
| 2,062,549 | 12/1936 | Wold | 187/8.43 |
| 2,188,763 | 1/1940 | Swan | 188/67 |
| 2,571,067 | 10/1951 | Seckendorf | 254/133 R |
| 2,576,158 | 11/1951 | Wallace | 187/8.75 |
| 2,637,522 | 5/1953 | Wallace | 187/8.45 |

FOREIGN PATENT DOCUMENTS

| 17684 | 1/1929 | Australia | 187/8.45 |
| 564117 | 9/1958 | Canada | 254/133 R |
| 902185 | 1/1954 | Fed. Rep. of Germany | 254/134 |
| 496877 | 8/1954 | Italy | 187/8.43 |
| 347602 | 4/1931 | United Kingdom | 254/89 |

Primary Examiner—Joseph J. Rolla
Assistant Examiner—Kenneth Noland
Attorney, Agent, or Firm—Murray Schaffer

[57] ABSTRACT

This device is of the type comprising supports at four points, two of which are interconnected in the manner of a balance by hydraulic or mechanical balancing devices (3, 10). The balancing devices are adjustable in height and at least one of the other two supports are also adjustable in height.

9 Claims, 8 Drawing Figures

U.S. Patent   Apr. 29, 1986   Sheet 2 of 2   4,585,092
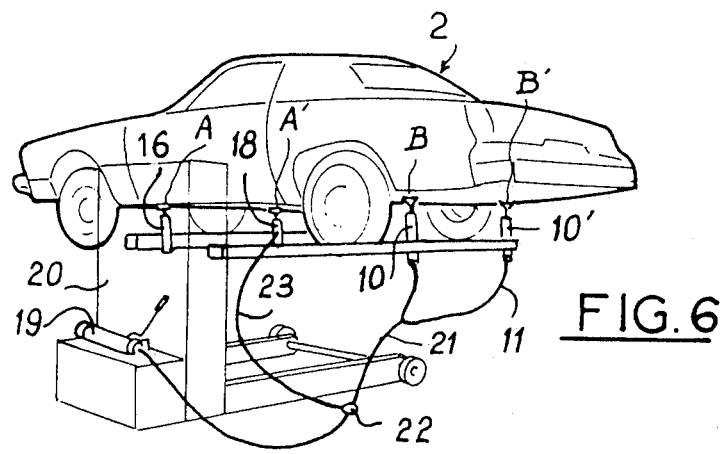
FIG. 6
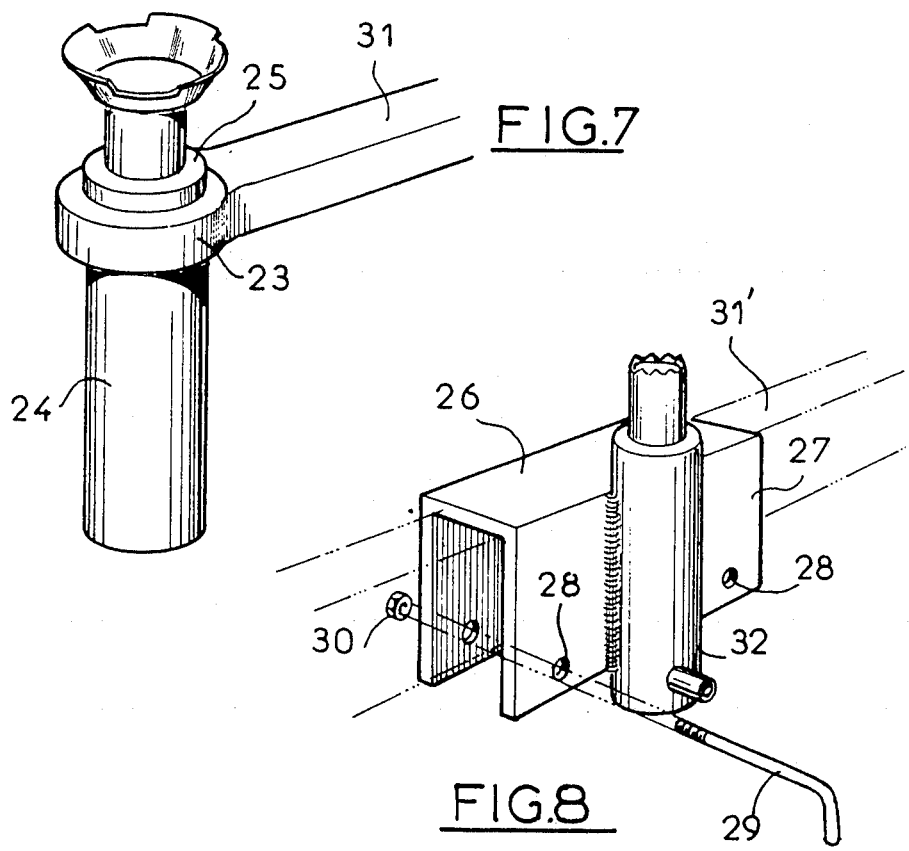
FIG. 7
FIG. 8

DEVICE FOR SETTING THE ATTITUDE AND THE MEASURING HEIGHT OF THE BODY OF A VEHICLE TO BE CHECKED ON A SURFACE PLATE, ELEVATOR, STAYS OR OTHER MEANS WITHOUT SUBJECTING IT TO ANY WARPING STRESS

DESCRIPTION

The present invention relates generally to apparatus for carrying out the diagnosis or repairing of deformations of a vehicle which had an accident and is more particularly concerned with an improved device for placing the vehicle to be checked on the supports of said apparatus without hiding any possible twist in the body.

It is known to employ a surface plate for determining the deformations undergone by the body of a vehicle which has had an accident, this surface plate being part of a rigid perfectly planar table on which the body of the vehicle is placed so that it is possible to measure the differences in height of various parts of the vehicle relative to the surface of the surface plate.

For this purpose, the vehicle must be placed on supports at four points so that it is stable and any risk of accident is avoided.

This operation has the drawback of hiding any possible twist in the body in that this body bears on said supports notwithstanding its warping simply by the fact that it is elastically deformable under the action of its weight.

It is also necessary, for the purpose of carrying out certain checking measurements, to place the vehicle in a given "attitude", i.e. in such manner that a reference plane related to the body is brought to a horizontal position or parallel to the plane of the surface plate. This operation involves setting the position of the vehicle in roll and pitch, i.e. with respect to two intersecting axes.

Heretofore, this operation was carried out by disposing the vehicle on four supports the height of which is adjusted in succession with the practically inevitable drawback of producing a warping of the body.

Further, it is also necessary to adjust the height of the reference plane of the vehicle above the plane of the surface plate and this is also carried out by adjusting the height of the supports, with the drawback of either hiding a possible twist if the vehicle is placed on pre-set supports or producing a warping if the height of the supports is adjusted with the vehicle in position.

An object of the invention is to overcome these drawbacks and to provide a device whereby it is possible to put the body of a vehicle in a given attitude and at a given height without subjecting it to warping stresses so as to proceed to the diagnosis and repairing of the deformations of this vehicle which has had an accident by measuring these deformations precisely on a surface plate, on an elevating apparatus or even on any ground surface.

The invention therefore provides a device for putting the body of a vehicle in a given attitude without subjecting it to any stresses, of the type comprising support means at four points two of which are arranged as a balance by a hydraulic or mechanical balancing means, wherein said balancing means is adjustable in height.

According to another feature of the invention, at least one of the two support means interconnected by the balancing means is adjustable in height.

In another embodiment of the invention, in the case of a hydraulic balancing means constituted by hydraulic jacks whose cylinders freely communicate with each other, the two jacks are simultaneously adjustable in height.

Advantageously, at least one of the two support means which are not interconnected as a balance is adjustable in height.

Further features and advantages of the invention will be apparent from the ensuing description with reference to the accompanying drawings which are given solely by way of example and in which:

FIG. 6 is an assembly view in perspective of a vehicle placed in a given attitude by means of a device according to the invention on the fork of a lift truck;

FIG. 7 is a partial perspective view of an adjustable raising means showing an embodiment of the means for fixing this raising means to the end of a branch of an elevating bridge of the type having two columns;

FIG. 8 is a partial perspective view of another embodiment of the means for fixing a raising means which is part of the attitude-setting device according to the invention.

Figure 1:
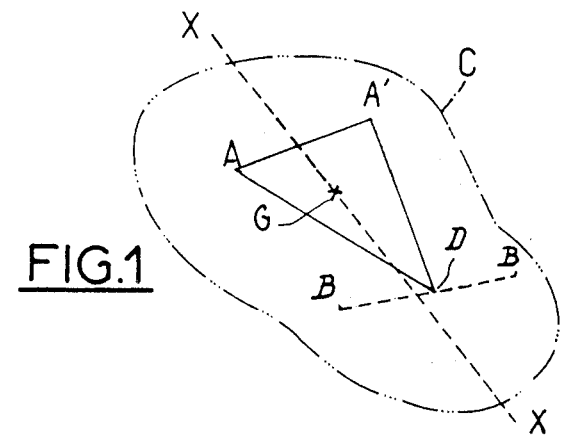
FIG. 1 is a diagram illustrating the underlying principle of the device according to the invention.

With reference to the diagram of FIG. 1, let it be assumed that a body C, for example the body of a vehicle shown in dot-dash lines and having any irregular lower surface comprising at least one reference point, must be supported without being subjected to any stress resulting in particular from the force of gravity acting in an offset or overhanging manner which would be liable to deform the body. The body C has a centre of gravity G located in a vertical plane indicated by the axis X—X.

This body C is placed in such manner that its irregular lower surface bears on four support points AA', BB' which are located in pairs on each side of the vertical plane containing the centre of gravity G at the four corners of a four-sided configuration.

If two of the four support points on one side of said four-sided configuration, for example the points BB', are interconnected by means for constraining them to move simultaneously in opposite directions and through equal distances downwardly and upwardly on each side of an intermediate point or fulcrum D located at equal distances from the points BB', the body C would bear in stable equilibrium on the ground on three bearing points A, A', D which define a triangle within the limits of which the centre of gravity G of the body would be located.

The fact that the load is balanced by means of the device interconnecting the point BB', the body C will assume a given position determined by the position of the points A, A' and D and in which this body will be subjected to no stress due to the effect of the force of gravity owing to the self-balancing ensured by the device interconnecting the points BB' in the manner of a free balance.

It will also be understood that if the height of at least one of the support points AA' is adjusted, it is possible to bring to the horizontal a reference line related to the body C and extending roughly parallel to the side AA' of the triangle AA'D.

If the height of the support means interconnecting the points BB' as a balance is then adjusted, it is possible to bring another second reference line related to the body C and intersecting the axis AA' into a plane which is also horizontal.

In this way, the body C will have been brought to a given attitude.

Figure 2:
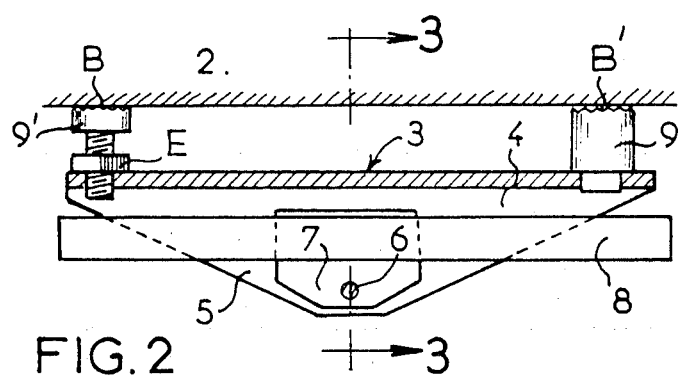
FIG. 2 is an elevational view of a mechanical balancing means adapted on one of the branches of the fork of a lift truck.

FIG. 2 shows an embodiment of a device for interconnecting in the manner of a balance two of the support points BB' for the lower surface of the body of the vehicle designated by the reference numeral 2.

This device constitutes a load balancing swing-bar generally designated by the reference numeral 3 and comprising an arm 4 constituted by an elongated inverted U-section support whose flanges 5 have a roughly triangular shape when viewed in elevation and which constitutes a fork in which a fulcrum pin 6 extends through the ends of the flanges 5 in the vicinity of the apex of the latter A yoke 7 is pivotally mounted on the pin 6 and adapted to straddle a support 8.

The arm 4 includes at each end a stay, the stay 9 being fixed in height whereas the opposite stay 9' is of the type including a screw and is adjustable in height by means of a nut E.

It will be understood that this device forms a mechanical swing-bar or balance whose support means 9, 9' support the body 2 of the vehicle at the points B, B' in a position of equilibrium about the fulcrum, without any overhanging, the two points A, A' of the body being supported by stays or pedestals, the stay A' being adjustable and the other stay A fixed, the whole being in stable equilibrium in a three-point support configuration.

It will be understood that the fulcrum pin 6 constitutes the bearing point D of the support means 9, 9' supporting the points B, B' of the body of the vehicle. Consequently, the latter is supported in stable equilibrium on the three points A, A', 6 disposed on a triangle configuration (the point 6 corresponding to the point D). It will also be understood that the pin 6 may also be mounted to be adjustable in height on the support 8 and that the latter may also be bodily adjustable in height by mechanical means of known type.

It will also be observed that the balancing device 3 may be detachably mounted on one of the branches of the fork of a lift truck and this permits the carrying out of measurements of deformations of the body, since the latter is in stable equilibrum and free from any stress due to the effect of gravity, the stays or pedestals, or other suitable support means, disposed below the points A, A' being then placed on the opposite branch of the fork of the lift truck.

Thus, for the purpose of effecting a diagnosis of the deformations of the body of the vehicle, it is possible to employ a tool of known type constituted for example by a rigid rectilinear rule including a spirit level and from the ends of which extend perpendicularly two adjustable parallel gauges, the end of one of the gauges being placed at a reference point of the body and the other permitting the measurement of the difference in height at another reference point of the body.

The device according to the invention may also be employed in the absence of a lift truck, since the support means may be employed on the ground and the body may be placed on the support means by the use of a simple jack.

Figure 3:
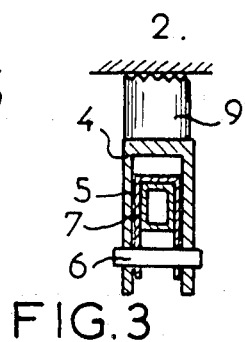
FIG. 3 is a sectional view taken on line 3—3 of FIG. 2.

FIG. 3, which is a sectional view taken along line 3—3 of FIG. 2, clearly shows the arrangement of the flanges 5 of the swing-bar 3 and of the yoke 7 on each side of the support 8 on which it is retained by the pin 6.

Figure 4:
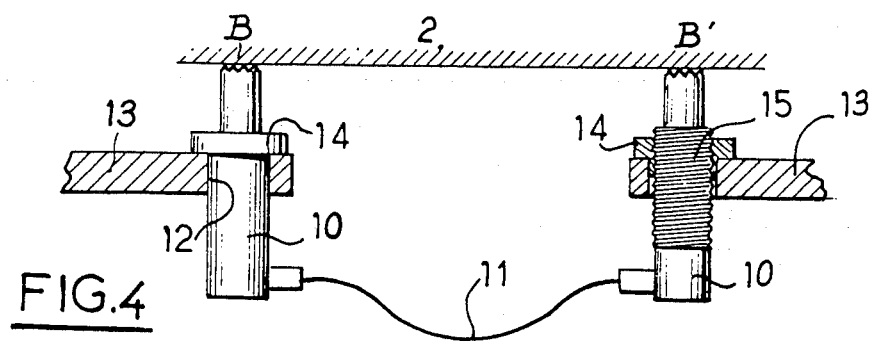
FIG. 4 is a diagrammatic view of the two support means which are interconnected by a hydraulic balancing means.

FIG. 4 shows another embodiment of a device according to the invention for interconnecting and supporting the points B, B' of the body 2 of the vehicle in the manner of a balance.

In this embodiment, which illustrates a hydraulic equivalent of a swing-bar, the support means employed are two hydraulic jacks 10 whose cylinders are each mounted on a support and are interconnected to provide a free communication of the fluid in the two cylinders by means of a pipe 11. It will be understood that the pistons of the jacks 10 move simultaneously in opposite directions-through equal distances in rising or descending relative to an imaginary point (D) which is placed at equal distances from the two jacks 10.

In the embodiment shown in FIG. 4, the jacks 10 have been shown mounted in apertures 12 provided adjacent the ends of two opposed forks 13 of a lift apparatus of the type having two columns on which each jack is retained by means of a collar 14 which may be screwed on the outer surface of the jack cylinder which is screwthreaded for this purpose, as shown at at 15.

It will be understood that, in this embodiment, as in the foregoing first embodiment, the height of the device may be adjusted by acting on the collar 14 so as to raise or lower the cylinder of the jack 10 relative to the fork 13 so that the body 2 of the vehicle is raised or lowered.

Figure 5:
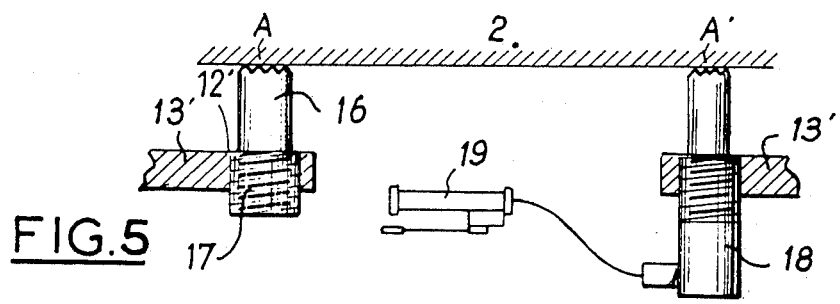
FIG. 5 is a diagrammatic view of two independent support means which are fixed to two branches of an elevating bridge having two columns.

FIG. 5 shows another advantageous embodiment of the support means employed for supporting the points A, A' of the body 2 of the vehicle, which are not interconnected in the manner of a balance.

According to this embodiment, a stay 16 comprises a screwthreaded end portion 17 which is screwthreadedly engaged in an aperture 12' of a support 13' which is in this embodiment the end of a fork of a lift apparatus of the type having two columns.

Although the support means disposed in the end of the opposite fork 13' may also be a fixed stay as mentioned hereinbefore, it is advantageous to arrange that this support means be also adjustable in height.

Preferably, according to the illustrated embodiment, the support means disposed below the point A' comprises a jack 18 whose cylinder may be screwthreadedly engaged in an aperture provided on the end portion of the fork or other support. This jack may be connected to a hydraulic pump 19 for a purpose which will be described.

In order to adjust the body in roll, it is sufficient to actuate the jack 18 by means of the pump 19 to bring to the horizontal a straight line related to the body of the vehicle and extending substantially parallel to the axis A, A'. The height of the device interconnecting the points B, B' in the manner of a balance is then adjusted so as to bring to the horizontal a straight line related to the body of the vehicle and intersecting the axis A, A', and the body of the vehicle is thus adjusted in pitch. Of course, in order to ensure that this adjustment in pitch does not destroy the adjustment of the body in roll, the support means A, A' arranged as a balance must be located on a transverse line substantially perpendicular to the longitudinal plane of symmetry of the vehicle.

The body of the vehicle has thus been placed in a given attitude and this enables the various measurements to be carried out for checking the geometry of the vehicle.

FIG. 6 shows a particularly advantageous embodiment of the device according to the invention in which the support means are detachably mounted on the branches of the fork of a lift truck generally designated by the reference numeral 20.

In this embodiment, the jacks 10, 10' interconnect the points B, B' in the manner of a balance and are interconnected by the pipe 11 which is connected to the pump 19 by a pipe 21 through a directional valve 22 to which is also connected the jack 18 below the point A' through a pipe 23. With the vehicle placed on the support means 16, 18 and 10, 10', the support stay 16 constitutes a fixed support point, the body of the vehicle assuming its position of equilibrium on the points B, B' which are interconnected in the manner of a balance by the hydraulic jack device 10, 10', 11 and it is then possible to actuate the pump 19 by acting on the directional valve 22 so as to raise only the jack 18 first of all and then the jacks 10 so that the vehicle can be extremely easily placed in the required attitude.

FIG. 7 shows a manner of securing a hydraulic or mechanical jack on the end portion of a branch of an elevating bridge of the type having two columns which comprises at its end an eye in which is inserted the cylinder of a jack 24 held in position by means of a collar 25 which may be screwthreadedly engaged on the outer screwthread of the cylinder as shown in FIG. 4.

FIG. 8 shows another embodiment of a detachable fixing device for a jack or other support on a branch of a fork lift truck or of a fork of an elevating bridge of the type having two columns designated by the reference numeral 31' and shown in dot-dash lines.

This fixing device comprises an inverted U-section member 26 whose flanges have a length exceeding the height of the branch 31' so as to extend below the lower part of the latter, the flanges 27 including apertures 28 in which may be inserted pins 29 having a screwthreaded end portion for cooperation with a nut 30. The cylinder of a hydraulic jack 32 is welded to one of the flanges 27.

It will be understood that the device according to the invention permits supporting the body of a vehicle in stable equilibrium and without any overhang capable of deforming the body, at a height which enables an operator to work easily, in particular on the branches of a lift truck or on the branches of a bridge, the completely clear access to the body of the vehicle enabling the diagnostic measurements and the measurements of possible deviations from symmetry and of the body to be easily carried out. This device also enables a body, and in particular a body of a vehicle, to be placed in a given attitude simply and rapidly with respect to two horizontal orthogonal axes, i.e. in roll and in pitch, which permits not only a checking of the dimensions specified by the constructor, but also a measurement of various angles by means of a clinometer.

Advantageously, the various jacks may each comprise a mechanical locking means of known type for maintaining their position once they have been adjusted.

Note that, in a modification(not shown), the arm of the mechanical swing-bar or balancing means may itself be made adjustable in height.

It should also be mentioned that the device according to the invention also permits carrying out another operation, namely the checking of the symmetry of the front or rear suspensions in height.

This operation can be carried out by disposing the support means arranged as a balance in such manner as to support, for example, the rear set of wheels above the ground, in the manner for achieving a given attitude, but with the front wheels bearing on the ground, and by measuring the height of the body from the ground, in the front, on the left and on the right at two symmetrical points.

Having now described my invention what I claim as new and desire to secure by Letters Patent is:

1. A device for setting the attitude and the measuring height of the body of a vehicle without subjecting it to any warping stress, said device being combined with said body of the vehicle and comprising four support means located at four corners of a four-sided configuration symmetrically arranged relative to a middle vertical longitudinal plane, which plane coincides with a middle vertical longitudinal plane of the vehicle body, a first two of said support means pertaining to one of said four sides directly supporting said body adjacent to a first end of said body and laterally adjacent to lateral sides of said body, a second two of said support means directly supporting said body adjacent to a second end opposed to said first end of said body and laterally adjacent ot lateral sides of said body, freely operative balancing means interconnecting said first two of said support means such that when one of said first two support means freely descends the other of said first two support means automatically freely rises to the same extent and vice-versa, and means for adjusting the balancing means in height relative to said second two of said support means.

2. A device according to claim 1, wherein the balancing means is mechanical and comprises a swing-bar means, and at least one of said two support means interconnected by the swing-bar means is individually adjustable in height.

3. A device according to claim 1, wherein the balancing means is hydraulic and at least one of said two support means interconnected by the balancing means is individually adjustable in height.

4. A device according to claim 1, wherein the balancing means is hydraulic and comprise two hydraulic jacks, hydraulic means putting the two jacks in communication with each other and means for adjusting the jacks in height simultaneously.

5. A device according to any one of the claims 1 to 4, wherein said support means are each provided with fixing means for detachably mounting them on branches of an elevating apparatus.

6. A device according to any one of the claims 1 to 3, wherein at least one of said second support means is adjustable in height.

7. A device according to claim 6, wherein said balancing means is hydraulic and includes hydraulic jacks, said at least one of said second two support means adjustable in height is a hydraulic jack, said device further comprising a hydraulic pump, a directional valve connected to the hydraulic jack of said at least one support means and to the hydraulic pump and connected also to the hydraulic jacks of the balancing means.

8. A device for setting the attitude and the measuring height of the body of a vehicle without subjecting it to any warping stress, said device comprising four support means located at four corners of a four-sided configuration, hydraulic balancing means interconnecting a first two of said support means pertaining to one of said four sides such that when one of said first two support means descends the other of said first two support means automatically rises to the same extent and vice-versa, said hydraulic balancing means comprising two hydraulic jacks, hydraulic means putting the two hydraulic jacks in communication with each other, and means for adjusting the two jacks in height simultaneously, at least one of a second two of said four support means opposed to said first two of said four support means being adjustable in height, said at least one of said second two support means adjustable in height being a hydraulic jack, said device futher comprising a hydraulic pump, a directional valve connected to the hydraulic jack of said at least one support means and to the hydraulic pump and connected also to the hydraulic jacks of the balancing means.

9. An elevating apparatus comprising elevating members and combined with a device for setting the attitude and the measuring height of the body of a vehicle without subjecting it to any warping stress, said device being combined with said vehicle body and comprising four support means located at four corners of a four-sided configuration symmetrically arranged relative to a middle vertical longitudinal plane which plane coincides with a middle vertical longitudinal plane of the vehicle body, a first two of said support means pertaining to one of said four sides supporting said body adjacent to a first end of said body and laterally adjacent to lateral sides of said body, a second two of said support means supporting said body adjacent to a second end opposed to said first end of said body and laterally adjacent to lateral sides of said body, freely operative balancing means interconnecting said first two of said support means such that when one of said first two support means descends the other of said first two support means automatically freely rises to the same extent and vice-versa, and means for adjusting the balancing means in height relative to said second two of said support means, said support means of the device being mounted on said elevating means.

* * * * *